United States Patent
Prasanna

(10) Patent No.: US 6,201,807 B1
(45) Date of Patent: Mar. 13, 2001

(54) REAL-TIME HARDWARE METHOD AND APPARATUS FOR REDUCING QUEUE PROCESSING

(75) Inventor: G. N. Srinivasa Prasanna, Clinton, NJ (US)

(73) Assignee: Lucent Technologies, Murray Hill, NJ (US)

( * ) Notice: Subject to any disclaimer, the term of this patent is extended or adjusted under 35 U.S.C. 154(b) by 0 days.

(21) Appl. No.: 08/607,730

(22) Filed: Feb. 27, 1996

(51) Int. Cl.[7] .............................. H04L 12/28; H04L 12/56
(52) U.S. Cl. .......................... 370/389; 370/412; 370/415; 370/429
(58) Field of Search .................................... 370/389, 394, 370/395, 396, 398, 409, 412, 415, 419, 422, 428, 437, 441, 229, 230, 235, 252, 301, 303, 411, 413, 417, 420, 421, 423, 429, 444, 455

(56) References Cited

U.S. PATENT DOCUMENTS

| | | | |
|---|---|---|---|
| 4,872,159 | * | 10/1989 | Hemmady et al. .................. 370/352 |
| 5,224,099 | * | 6/1993 | Corbalis et al. ..................... 370/412 |
| 5,233,606 | * | 8/1993 | Pashan et al. ....................... 370/418 |
| 5,319,753 | * | 6/1994 | MacKenna et al. .................. 710/48 |
| 5,528,587 | * | 6/1996 | Galand et al. ....................... 370/412 |
| 5,535,201 | * | 7/1996 | Zheng ................................. 370/412 |
| 5,742,600 | * | 4/1998 | Nishihara ............................. 370/409 |
| 5,748,629 | * | 5/1998 | Caldara et al. ...................... 370/413 |
| 5,768,273 | * | 6/1998 | Aznar et al. ........................ 370/395 |
| 5,850,395 | * | 12/1998 | Hauser et al. ...................... 370/398 |
| 5,872,769 | * | 2/1999 | Caldara et al. ..................... 370/230 |
| 5,892,762 | * | 4/1999 | Okuda et al. ........................ 370/395 |

* cited by examiner

*Primary Examiner*—Douglas W. Olms
*Assistant Examiner*—Phirin Sam

(57) ABSTRACT

A simple high speed Real-Time method and apparatus for processing a queue in a network queue server is presented. Long packets at the beginning of the queue are processed while a pointer chains down the queue to find shorter packets. When a shorter packet is found the pointer stops and waits for a timing threshold to be met. When the timing threshold is met the short packet is processed until completion and then work is resumed on the long packet. The method is implemented using a pointer to identify the position in the queue that is currently being processed, a pointer to search for the shorter packets, two registers to hold values of the respective pointers and memory to hold the location of the discontinued packet. An additional register is utilized to hold the incremented cycle processing time, and a final register is used to hold a threshold value for processing a packet. Lastly, a previous pseudo head register is also utilized when the queue is not doubly linked.

8 Claims, 2 Drawing Sheets

REAL-TIME HARDWARE METHOD AND APPARATUS FOR REDUCING QUEUE PROCESSING

TECHNICAL FIELD

This invention relates to communications, networking and microprocessors.

BACKGROUND OF THE INVENTION

Modern day data communications is accomplished by transferring bits (0's and 1's) between two communicating devices. These bits are usually segmented into units called packets and routed through a communications network. The packets are routed through the network by switching devices (queue servers), which process the packets and send them along different communications pathways to their final destination.

Packets often line up at a queue server waiting to be serviced by the queue server in the same way that a line at a bank might develop in front of a teller. The line is referred to as a queue. The packets would be the people in the queue and the teller would be the switch or queue server. However not all packets are the same size. Often a shorter packet that could be quickly processed by the queue server waits in the queue while a longer packet is serviced. As a result, the communicating parties at the end are delayed until a large packet that has nothing to do with their particular communication, is processed. Ultimately many different parties that are communicating through the switch (or queue server) would be slowed down, while the queue server processes a large packet that has nothing to do with their respective communications sessions.

It would be advantageous to service smaller length packets, located behind larger packets in the queue, without waiting for the large packets to be fully processed. Attempts have been made to design simple architectures that solve this queuing problem. Software scheduling techniques have been devised which increase the equity in processing the packets by examining the entire queue of packets. However, it is difficult to devise a high-speed and memory-efficient hardware implementation of this method, as needed by Asynchronous Transfer Mode (ATM) switches, or high speed queue servers. At least one fast implementation was attempted in an ATM switch. However, the method required complex manipulations of the pointers that identified the different packets. As a result, these methods required multiple read and write commands to the memory of the switch, which in turn help to make method slow to implement. Therefore, it would be advantageous to develop a simple hardware technique for reducing queuing delays that could be performed in Real-Time.

SUMMARY OF THE INVENTION

A simple method and apparatus for reducing Real-Time queuing delays, in a queue server is presented. The disclosed method, enables high-speed Real-Time processing of a queue. For example, the present invention, requires only a single read/write command to memory per system cycle, enabling queue processing speeds of 100 Mega hertz and above. In the present invention, a queue of packets is presented at a queue server (e.g, a network switch). The queue server takes the queue into available memory space for processing. A true head pointer (a pointer that points to the first packet in the queue) points to the beginning of the queue, the pointer is stored in a true head register (a register that records the location of the beginning of the queue). The queue server starts to process the queue while a pseudo pointer (a pointer that moves down the queue and points to a short packet in the queue and which is stored in a pseudo head register) searches through the queue for small packets. When a small packet is found the pseudo pointer stops moving down the queue. A processing counter is incremented with each processing cycle (an amount of time for processing, e.g. one clock cycle of an ATM queue server) of the queue. When a threshold value of the counter is reached, if the long packet has not been completely processed, the location in the long packet is stored in a register or a memory location in the system. The short packet is then processed to completion, after which processing of the long packet resumes at the location where processing of the long packet stopped. Once processing of the long packet is completed the next packet in the queue is processed.

BRIEF DESCRIPTION OF THE DRAWINGS

The objects, advantages and novel features of the invention will be more fully apparent from the following detailed description when read in connection with the accompanying drawings wherein.

DETAILED DESCRIPTION OF THE INVENTION

A method and apparatus for processing data packets of varying length is presented. Data packets of different length are presented to a queue server for processing. As the queue server processes the packets a queue of different length packets may form. For simplicity of explanation, a queue of long packets (64 bits of data and above) and short packets (below 64 bits) will be used to describe the invention. However, it should be appreciated that the disclosed method and apparatus can be applied to queues that have packets in a number of different categories beyond long and short as defined above, and where the criteria for jobs serviced can be different. The short jobs will be denoted as type A packets and the long jobs will be denoted as type B packets.

Packets arrive at a queue server which processes them. When several packets arrive at the queue server the packets form a queue. The queue server normally has the capability to take several of the packets into memory locations allocated in the queue server for packet storage and processing. The queue server processes the queue of packets by moving the packets through different memory locations and then ultimately sending the packets on the next leg of the journey, after manipulating the packets in the queue server.

Figure 1:
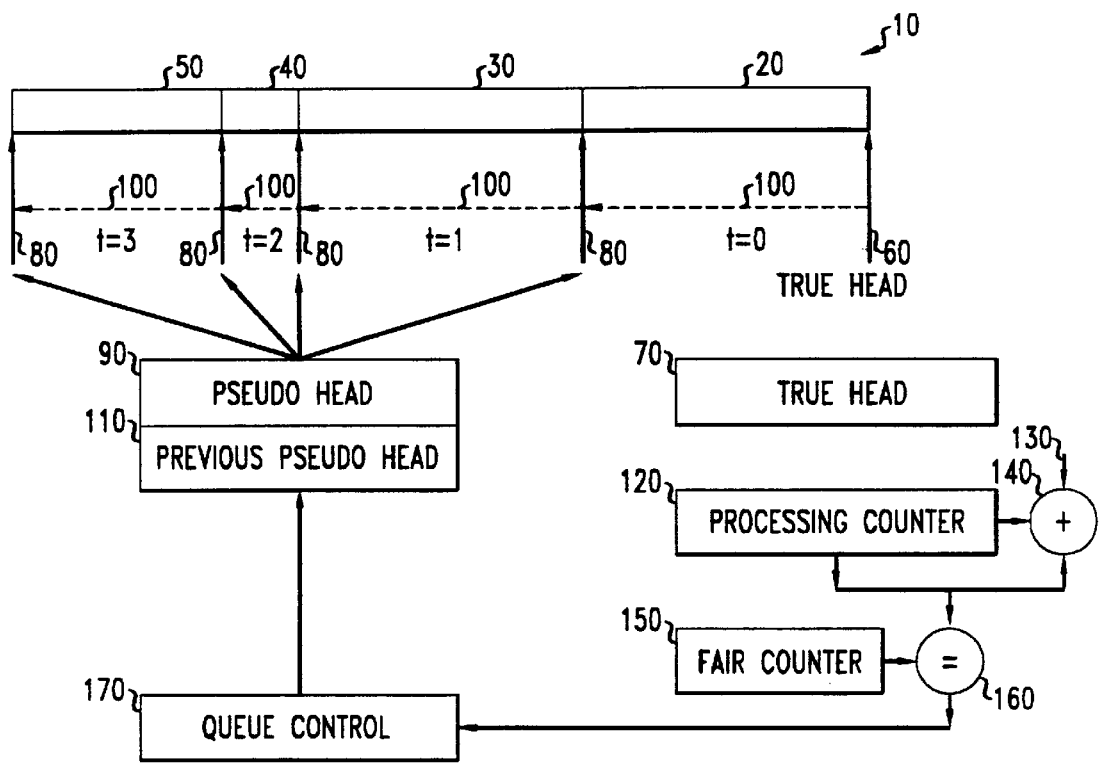
FIG. 1. displays the conceptual model of the present invention.

FIG. 1 displays an illustrative model of the proposed invention. In FIG. 1 a queue of packets 10 is composed of both type B packets denoted by 20, 30 and 50 and one type A packet denoted by 40. The queue 10 would be located in the memory of the queue server. Packets in the queue are identified by their respective locations in memory. The beginning of the first type B packet 20, would be pointed to by a true head pointer 60. The memory address that the true head pointer 60 points too, is stored in a true head register 70. After a first clock cycle of processing the pseudo head pointer 80 moves through the packets with each clock cycle, as denoted by 100, until a type A packet (i.e. 40) is found in the queue. At any clock cycle, the memory address that the pseudo head pointer 80 points to is stored in a pseudo head register denoted by 90. At any clock cycle the previous value of the pseudo head pointer is stored in the previous pseudo head register 110.

A processing counter 120 counts the processing cycles of the queue server as the queue server processes the packets. Adder 140 increases the processing counter 120 by a value (e.g. 1, 2, 3 . . . ) as denoted by 130, every time the queue server goes through one cycle of processing the queue 10. A threshold value is maintained in fair counter 150. A value in the processing counter 120 is compared with the fair counter value 150 by the comparator 160. When the value in the processing counter 120, equals the value in the fair counter 150, a signal is applied to the queue control 170 to control the queue processing in the queue server.

In an illustrative example of the method and apparatus of the present invention, both the true head pointer 60 and the pseudo head pointer 80 would be positioned at the start of the first type B packet 20 at time t=0. The queue server would then start to process the queue 10. With the first cycle of processing the queue server would start to process the first type B packet 20, the pseudo head pointer would move to the beginning of the second type B packet 30, the processing counter 120 would be incremented by one and then compared with the fair counter 150 which has a threshold value (e.g. 10 units). During the second time period, the queue server is still processing the first type B packet, the pseudo head pointer is moved to the beginning of the type A packet 40, the processing counter 120 is incremented by one and then compared with the fair count register 150. During a third time period, the queue server is still processing the first type B packet 20, the pseudo head pointer 80 is still positioned at the beginning of the type A packet 40, the processing counter 120 is incremented and then compared to the fair counter 150. However, to demonstrate the operation of the disclosed method and apparatus, suppose that the value of the processing counter 120 equals the value of the fair counter 150 meaning that the queue server has reached the minimum threshold set for processing one packet. A signal would be sent to the queue control 170. The queue control 170 would stop processing on the first type B packet 20 and begin on the first type A packet 40. The memory location in the type B packet, where processing was stopped, would be stored in a register or memory location. It should be appreciated that the pseudo head pointer value is always stored in the pseudo head register and the previous pseudo head pointer value is always stored in the previous pseudo head register. Processing would continue on the first type A packet 40 until the complete packet was processed. After the first type A packet 40 is completely processed, the queue server would reference the memory location or register for the location in the first type B packet 20, where processing was stopped. The queue server would then continue to process the first type B packet 20 at the location where processing stopped. When the first type B packet is completed the true head pointer would be updated to point to the next packet in the queue. The pseudo head pointer 80 would continue to move through the queue to locate another type A packet, and the pseudo head register 90 (and the previous pseudo head register 110) would be continuously updated. The previous pseudo head register 110 is always one cycle delayed from the pseudo head register. The process described would be continued until the entire queue is processed. When the pseudo head register reaches the end of the queue it stops there.

An alternate method of implementing the present invention would include processing the type A packet as soon as it is encountered by the pseudo head pointer 80. Another technique can find a short packet and then determine how long the packet has waited before the decision to preempt processing is made.

A third alternative would include applying a threshold to the processing of the type A packet 40. In this scenario, if processing of the type A packet is not complete when the processing counter 120 meets the threshold held by the fair counter 150, processing on the first type B packet would resume until the threshold value held in the fair count register 150 is met. When the threshold value in the fair count register 150 is met, if the first type B packet is still not completed, then the queue server would return to processing the type A packet at the point where processing was discontinued. This process of going back and forth between the type A and type B packets would continue until either the type A or type B packet was completed. It should be appreciated that the same counter does not have to be used for type A and type B packets. Furthermore, each type of packet can also have different threshold values.

Computer code implementing the queue service methodology is presented in Appendix I. While the computer code presented in Appendix I is presented sequentially, the actual processing of the queue occurs in parallel in different hardware components. Some of the parallel operations include but are not limited too, the register updates, the counter increments, the comparator operations, and the queue controller operations. Software code to implement the present method could be implemented in C or another higher level language. In the pseudo code presented in Appendix I, the packets could be maintained as linked list. When forward linked list is used to represent the packets the previous pseudo code register 110 is required, to resplice (delete the packet processed and relink the previous packet to the next packet in the queue) the list after the type A packet has been processed. However when the method is implemented using both backward and forward linked list the previous pseudo code register 110 would not be required because the backward linked list would enable the queue to be respliced.

Figure 2:
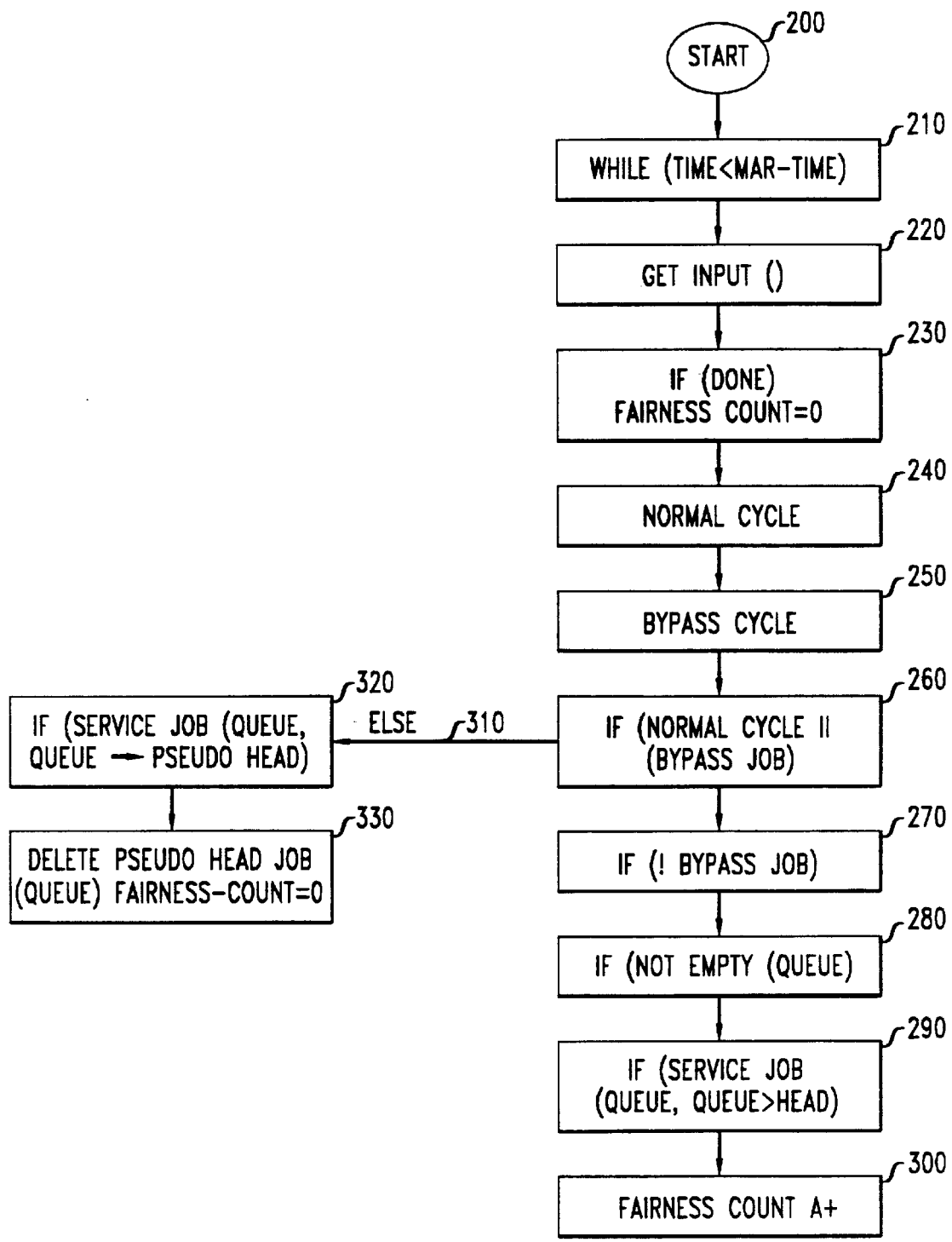
FIG. 2. displays flow diagram of the computer code detailed in Appendix I.

FIG. 2 displays the flow diagram of the computer code detailed in Appendix 1. The flow diagram describes the entire methodology of the present invention, it should be appreciated the flow diagram is executed in one clock cycle, and multiple passes through the flow diagram are required to complete processing of a packet. At the start of the processing at position 200, both the true pointer and the pseudo head pointer are positioned at the beginning of the queue. At 210, processing of the current packet at the head of the queue would be performed.

The first step in the computer code is to get an input, as denoted by 220. Getting an input translates physically into a packet being appended at the end of the queue. At 230, if the packet at the head is completely finished, reset the fairness count to zero and processing of the next packet at the head of the queue begins (the true head pointer and register are updated). At 240 the normal cycle for processing is defined as when the fairness counter is less than the maximum fair count defined. Physically, this step translates into processing a large packet since if the processing threshold has not been met, processing on the current large packet can continue. At step 250, the bypass cycle is defined as when the pseudo head pointer reaches a short packet. When the queue server is processing in the normal cycle or not in the bypass cycle, as denoted by 260, and in addition when the queue server is not in a bypass cycle as denoted by 270, the pseudo head pointer moves down to the next packet and the previous pseudo head pointer is also updated. Also the program checks to make sure that the queue server is not at the end of the queue, as denoted by 280. Once the queue server is not at the end of the queue, the packet that is at the true head is serviced as denoted by 290. The job service step denoted by 290 returns "true" if the job is completed and "false" if the job is not completed. Finally at 300, the fairness counter is incremented by one to denote that one cycle of processing has occurred on the packet.

If the time is equal to or greater than the maximum time as denoted by 310 a different approach is taken. The maximum time would be a time that is set for that particular network or application. For example, if the maximum time is short then processing on large packets would be preempted often, enabling fast short packet processing. On the other hand if the maximum time is large, the long packets are processed more efficiently and the shorter packets are processed more slowly. Physically when the time is equal to or greater than the maximum time, processing of the long packet is preempted and processing on the short packet, pointed to by the pseudo head register, begins. This step is denoted by 320. Once processing of the short packet is completed, the short packet is deleted from the queue and the fairness counter is set to zero, as denoted by 330. After the short packet is finished processing restarts in the long packet where processing stopped.

It should be appreciated that in a normal cycle one memory operation is required and in a bypass cycle two memory operations are required per cycle, to manipulate the queue. In a normal cycle only a read of the queue is needed to update the pseudo head pointer. In a bypass cycle a read, modify, write operation is required to update the pointer and resplice the queue. As a result, the present invention exhibits high speed real-time performance.

While the illustrative embodiments use time as the preempting mechanism, it should be appreciated that the decision on when to preempt can be based on many criteria which are adaptable to a hardware implementation. For example, the architecture can be implemented so that as soon as a short packet is located in the queue, processing on the long packet will be preempted. In addition, the present methodology can be implemented so that multiple pseudo pointers can be used to find a number of short packets before preemption occurs.

While several embodiments of the invention are disclosed and described, it should be appreciated that various modifications may be made without departing from the spirit of the invention or the scope of the subjoined claims.

APPENDIX I

```
fair_service()
{
 done=TRUE;
 while (time < MAX_TIME) {
  get_input();
  if (done)/* next packet at head */
    fairness_count=0;
  normal_cycle = (fairness_count < MAX_FAIRNESS_COUNT);
  bypass_job = is_bypass_job(queue,queue->pseudo_head);
  /* READ elem length */
  if (normal_cycle || (!bypass_job)) {
   if (!bypass_job)
     update_psuedo_head(queue);/* READ next*/
   if (not_empty(queue))
     if (service_job(queue,queue->head))
       done=TRUE;
     else
       done=FALSE;
     fairness_count++;
  {
```

APPENDIX I-continued

```
   else
   /* service this job completely, delete it from the list, and fixup the list*/
   if (service_job(queue,queue->pseudo_head)) {
     delete_psuedo_head_job(queue);/* RWM/WRITE next*/
     fairness_count=0;
   }
  }
 }
}
```

The invention claimed is:

1. A queue processing system comprising at least one queue server for processing a queue, wherein said queue server further comprises:

a true head register, for holding a first address of said queue currently being processed by said queue server;

a processing counter register, for maintaining time used in processing said queue;

a fair counter register, including a value which is compared with said time in the processing counter register;

a pseudo head register, for holding a second address of a short packet at a subsequent position in said queue;

a queue controller, for switch the processing of the queue server between a packet located at a first address and a short packet located at said second address, wherein the queue server is able to selectively process the short packet before returning to the packet located at said first address.

2. A queue processing system as claimed in claim 1 wherein said queue server further comprises an adder for incrementing said processing counter register.

3. A queue processing system as claimed in claim 1 wherein said queue server further comprises a previous pseudo head register for holding a previous value of said pseudo head register.

4. A queue processing system as claimed in claim 1 wherein said queue server further comprises a comparator for comparing said processing counter with said fair counter.

5. A queue processing system as claimed in claim 1 wherein said queue server further comprises a true head pointer stored in said true head register.

6. A queue processing system as claimed in claim 1 wherein said queue server further comprises a pseudo head pointer which is stored in said pseudo head register.

7. A queue processing system as claimed in claim 1, wherein the queue is implemented in hardware memory as a linked list (standard technique) and the number of read, write, and read-modify-write operations per cycle are minimized.

8. A method of processing a queue consisting of a plurality of first packets and at least one second packet, with a queue server including a true head pointer, a pseudo head pointer, a true head register, a pseudo head register, a previous pseudo head register, a processing counter and a fair counter, said method comprising the steps of:

(a) storing a value designating a beginning of said queue in said true head register, (b) setting said true head pointer and said pseudo head pointer to said value, (c) at a first cycle time, processing one of said plurality of first packets, moving said pseudo pointer to a second of said plurality of first packets, storing a value of said pseudo pointer in said pseudo head register thereby creating an old value, storing said old value in said previous pseudo head register, incrementing said processing time counter, and comparing said processing time register with said fair count counter, (d) at a second cycle time, processing one of said plurality of first packets, moving said pseudo pointer to said at least one second packet, updating said value of said pseudo pointer with an address of said at least one second packet, incrementing said processing time register, storing said pseudo pointer in said pseudo head register, and comparing said processing time counter with said fair count register, (e) at a third cycle time, preempting processing of said one of said plurality of first packets, storing a memory location where said processing of said one of said plurality of first packets stopped, processing said at least one second packet, and (f) at a fourth cycle time, completing processing of said at least one second packet, returning to processing said one of said plurality of said at least one first packets, and then updating the true head register, (g) repeating steps (c) through (f) until all packets in said queue are processed thereby processing said queue.

* * * * *